(12) United States Patent
Musha et al.

(10) Patent No.: US 7,861,850 B2
(45) Date of Patent: Jan. 4, 2011

(54) CONVEYANCE APPARATUS, CLEANING APPARATUS, AND MANUFACTURING METHOD FOR A LIQUID CRYSTAL DISPLAY

(75) Inventors: Sei Musha, Kawasaki (JP); Emiko Nakagawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 194 days.

(21) Appl. No.: 12/125,611

(22) Filed: May 22, 2008

(65) Prior Publication Data

US 2008/0289933 A1 Nov. 27, 2008

(30) Foreign Application Priority Data

May 23, 2007 (JP) ............... P2007-136407

(51) Int. Cl.
*B65G 47/00* (2006.01)
(52) U.S. Cl. ............... 198/468.3; 198/468.9; 198/460.2
(58) Field of Classification Search .............. 198/465.4, 198/460.2, 468.01, 468.3, 468.4, 463.3, 468.9, 198/468.6
See application file for complete search history.

(56) References Cited

U.S. PATENT DOCUMENTS

| | | | | |
|---|---|---|---|---|
| 4,408,950 A | * | 10/1983 | Laskey | 198/463.3 |
| 5,072,823 A | * | 12/1991 | Takahashi et al. | 198/468.4 |
| 5,222,854 A | * | 6/1993 | Blatt et al. | 198/463.3 |
| 5,452,981 A | * | 9/1995 | Crorey et al. | 198/468.6 |
| 7,562,765 B2 | * | 7/2009 | Dodo et al. | 198/468.6 |
| 7,690,706 B2 | * | 4/2010 | Wild et al. | 198/463.3 |

FOREIGN PATENT DOCUMENTS

JP 2005-99595 4/2005

* cited by examiner

*Primary Examiner*—James R Bidwell
(74) *Attorney, Agent, or Firm*—Oblon, Spivak, McClelland, Maier & Neustadt, L.L.P.

(57) ABSTRACT

A conveyance apparatus includes: a stage section having: a feeding stage on which a work to be fed is placed; a first working stage on which the work is subjected to a working process; a second working stage on which the work is subjected to the same working process as that of the first working stage; and a discharging stage on which the work to be discharged is placed; and a conveyance section having: a feeding arm feeding the work from the feeding stage to the working stages; a discharging arm which is provided on a discharging stage side of the feeding arm and discharges the work from the working stages to the discharging stage; a first drive unit moving the two arms in an alignment direction of the four stages; and a second drive unit changing distance between the two arms in the alignment direction.

11 Claims, 8 Drawing Sheets

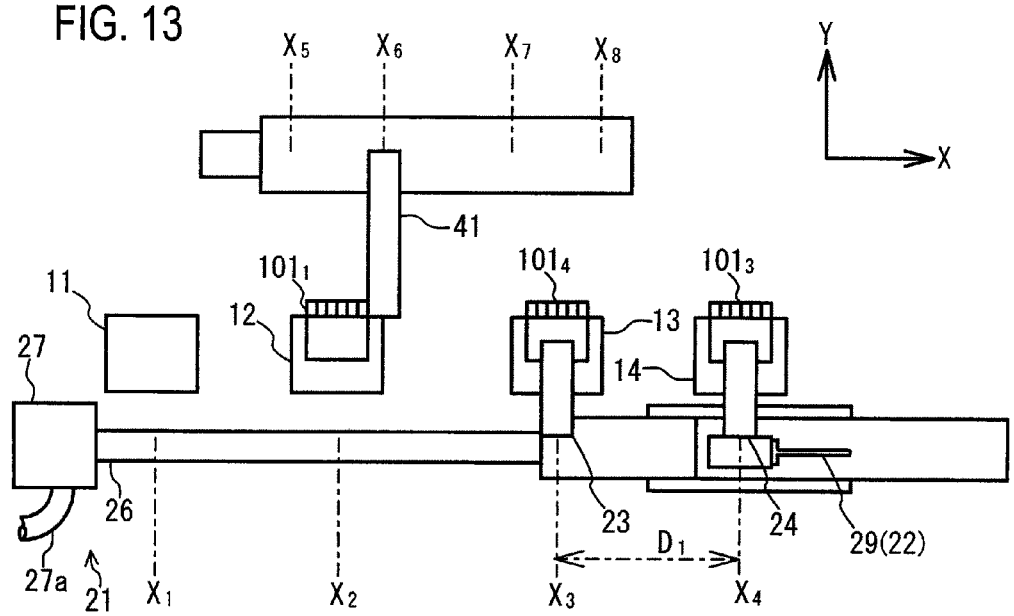
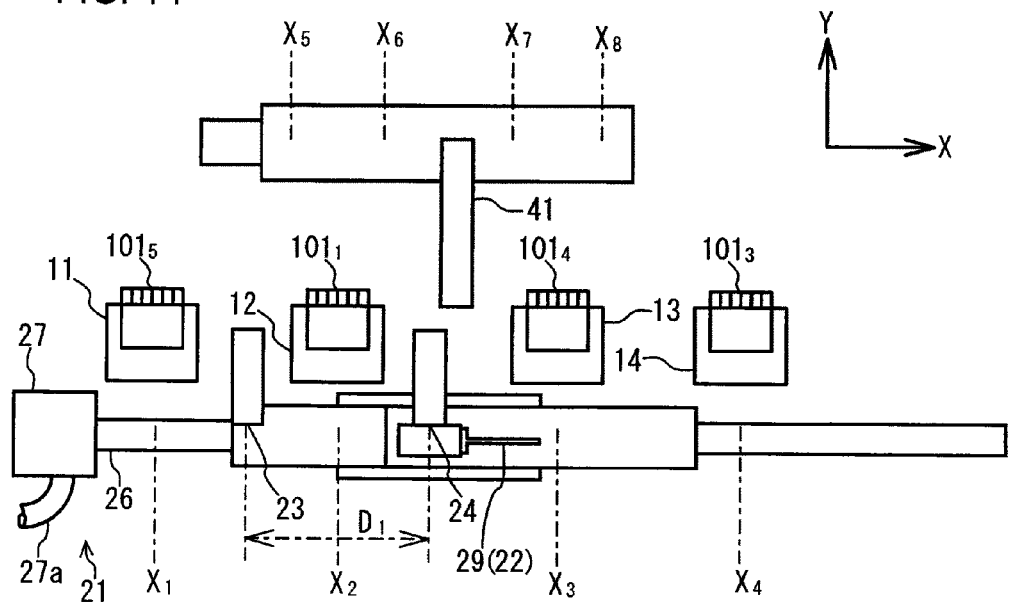

CONVEYANCE APPARATUS, CLEANING APPARATUS, AND MANUFACTURING METHOD FOR A LIQUID CRYSTAL DISPLAY

CROSS REFERENCE TO RELATED APPLICATIONS AND INCORPORATION BY REFERENCE

This application is based upon and claims the benefit of priority from prior Japanese Patent Application P2007-136407 filed on May 23, 2007; the entire contents of which are incorporated by reference herein.

BACKGROUND OF THE INVENTION

1. Field of the Invention

The present invention relates to conveyance apparatus and cleaning apparatus for use in a process of manufacturing a liquid crystal display or the like and a manufacturing method for a liquid crystal display.

2. Description of the Related Art

There are conventionally known conveyance and cleaning apparatuses for use in a manufacturing process of a liquid crystal display or the like and a conventionally known manufacturing method for a liquid crystal display using the above conveyance and cleaning apparatuses.

Japanese Patent Laid-open Publication No. 2005-99595 discloses a cleaning apparatus for cleaning terminals exposed and aligned in an end of a display unit. This cleaning apparatus includes: a feeding stage on which a substrate to be fed to the cleaning process is placed; a first substrate holding stage at which a first cleaning process is performed; a second substrate holding stage at which a second cleaning process is performed; an intermediate stage at which the substrate is temporarily placed before being conveyed to a subsequent process; and three substrate holding heads for holding substrates when the substrates are conveyed between the adjacent stages.

The four stages are arranged at equal intervals. The relative positions of the three substrate holding heads are fixed at intervals equal to those between the stages. The three substrate holding heads move without changing the interval in a direction that the four stages are aligned.

In this cleaning apparatus, substrates are individually placed on the feeding stage, first substrate holding stage, and second substrate holding stage. In this state, at the first substrate holding stage, the first cleaning process is performed, and at the second substrate holding stage, the second cleaning process different from the first cleaning process is performed.

Next, the three substrates placed on the feeding stage and first and second substrate holding stages are held by the three substrates holding heads. These three substrates are moved together with the respective three substrates holding stages and then placed on the first and second substrate holding stages and intermediate stage, respectively.

The substrate placed on the intermediate stage is conveyed to a manufacturing apparatus performing the subsequent process, and a new substrate already subjected to a previous process is conveyed to the feeding stage.

However, in the cleaning apparatus of the aforementioned Patent Literature, since all the substrates are conveyed at the same time in the substrate conveyance process, the substrate cleaning processes are not performed during the substrate conveyance process. Accordingly, the substrate conveyance and cleaning processes need to be preformed at different times, thus causing a problem increasing operation time.

SUMMARY OF THE INVENTION

The present invention was invented to solve the aforementioned problem, and an object of the present invention is to provide a conveyance apparatus, a cleaning apparatus, and a manufacturing method for a liquid crystal display which can shorten manufacturing time.

A conveyance apparatus according to a first aspect of the present invention includes: a stage section and a conveyance section. The stage section includes: a feeding stage on which a work to be fed is placed; a first working stage on which the work is subjected to a working process; a second working stage on which the work is subjected to the same working process as that of the first working stage; and a discharging stage on which the work to be discharged is placed, the feeding stage, first working stage, second working stage, and discharging stage being sequentially aligned. The conveyance section includes: a feeding arm feeding the work from the feeding stage to the first or second working stage; a discharging arm which is provided on a discharging stage side of the feeding arm and discharges the work from the first or second working stage to the discharging stage; a first drive unit moving the feeding and discharging arms in an alignment direction of the four stages; and a second drive unit changing distance between the feeding and discharging arms in the alignment direction.

A cleaning apparatus according to a second aspect of the present invention includes a stage section, a conveyance section, and a cleaning section. The stage section includes: a feeding stage on which a work to be fed is placed; a first working stage on which the work is subjected to a cleaning process; a second working stage on which the work is subjected to the same cleaning process as that of the first working stage; and a discharging stage on which the work to be discharged is placed, the feeding stage, first working stage, second working stage, and discharging stage being sequentially aligned. The conveyance section includes: a feeding arm feeding the work from the feeding stage to the first or second working stage; a discharging arm which is provided on a discharging stage side of the feeding arm and discharges the work from the first or second working stage to the discharging stage; a first drive unit moving the feeding and discharging arms in an alignment direction of the four stages; and a second drive unit changing distance between the feeding and discharging arms in the alignment direction. The cleaning section includes: a cleaning head cleaning the works; and a cleaning section drive mechanism moving the cleaning head in the alignment direction.

A method of manufacturing a liquid crystal display according to a third aspect of the present invention includes: sealing to each pair of substrates with a terminal formed thereon and exposed the terminal; cleaning the terminal on the substrates placed on one of a pair of working stages by moving a cleaning head by a cleaning section drive mechanism; conveying the substrates already cleaned and placed on the one of the pair of working stages by a discharging arm for discharging and the substrates to be cleaned next to the other of the pair of working stages by a feeding arm for feeding; and attaching a driver IC to the terminal, wherein a part of the cleaning and a part of the conveying are simultaneously performed.

According to the present invention, it is possible to perform a working process such as the cleaning process of a work at one of working stages while conveying another work to the other working stage. Accordingly, the manufacturing time can be shortened.

BRIEF DESCRIPTION OF THE DRAWINGS

FIG. 13 is a plan view of the cleaning apparatus for schematically explaining a process.

FIG. 14 is a plan view of the cleaning apparatus for schematically explaining a process.

DETAILED DESCRIPTION OF THE INVENTION

Figure 1:
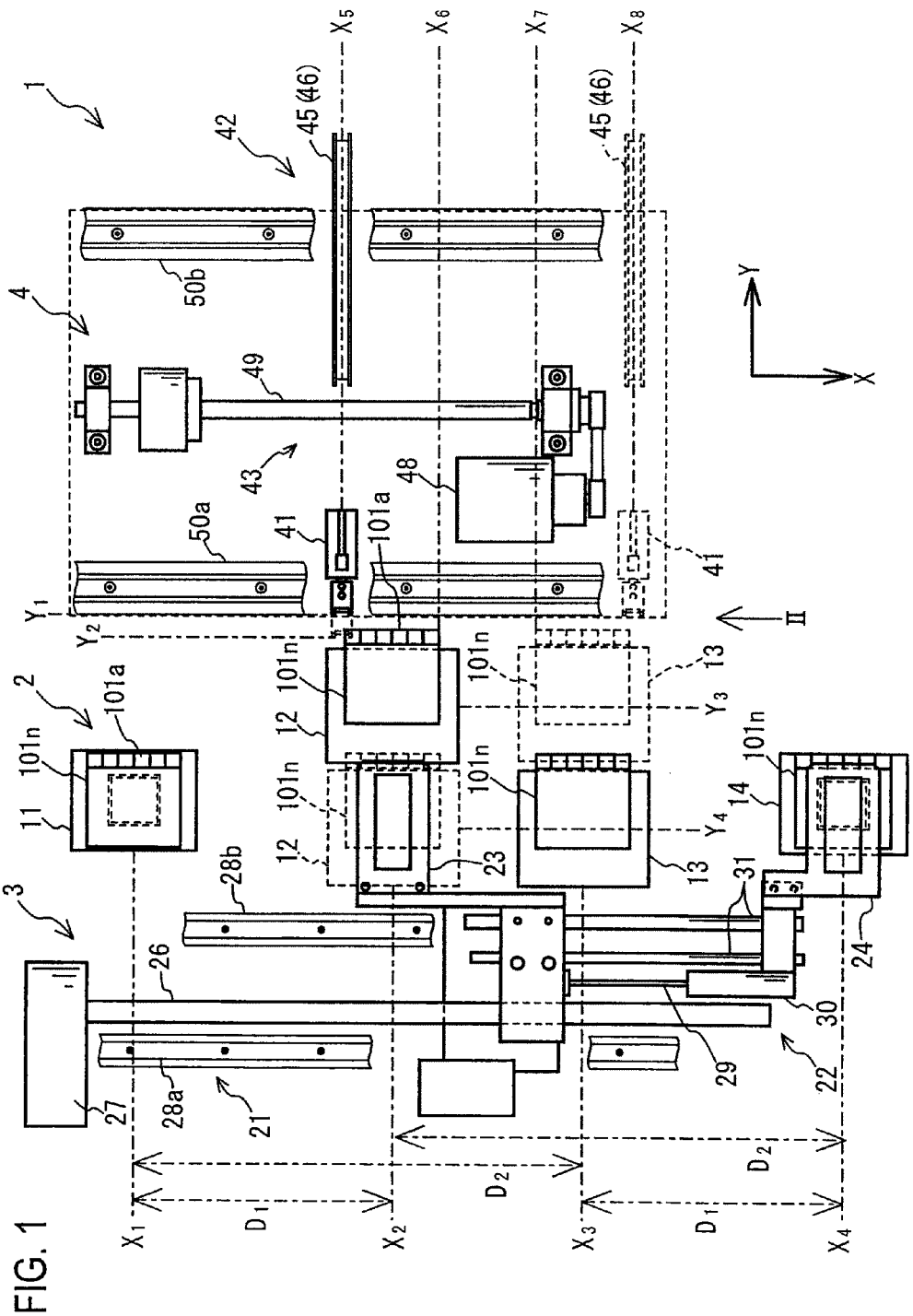
FIG. 1 is a plan view of a cleaning apparatus according to an embodiment.

Various embodiments of the present invention will be described with reference to the accompanying drawings. It is to be noted that the same of similar reference numerals are applied to the same or similar parts and elements throughout the drawings, and the description of the same or similar parts and elements will be omitted or simplified.

Hereinafter, a description is given of an embodiment of the present invention with reference to the drawings.

Figure 2:
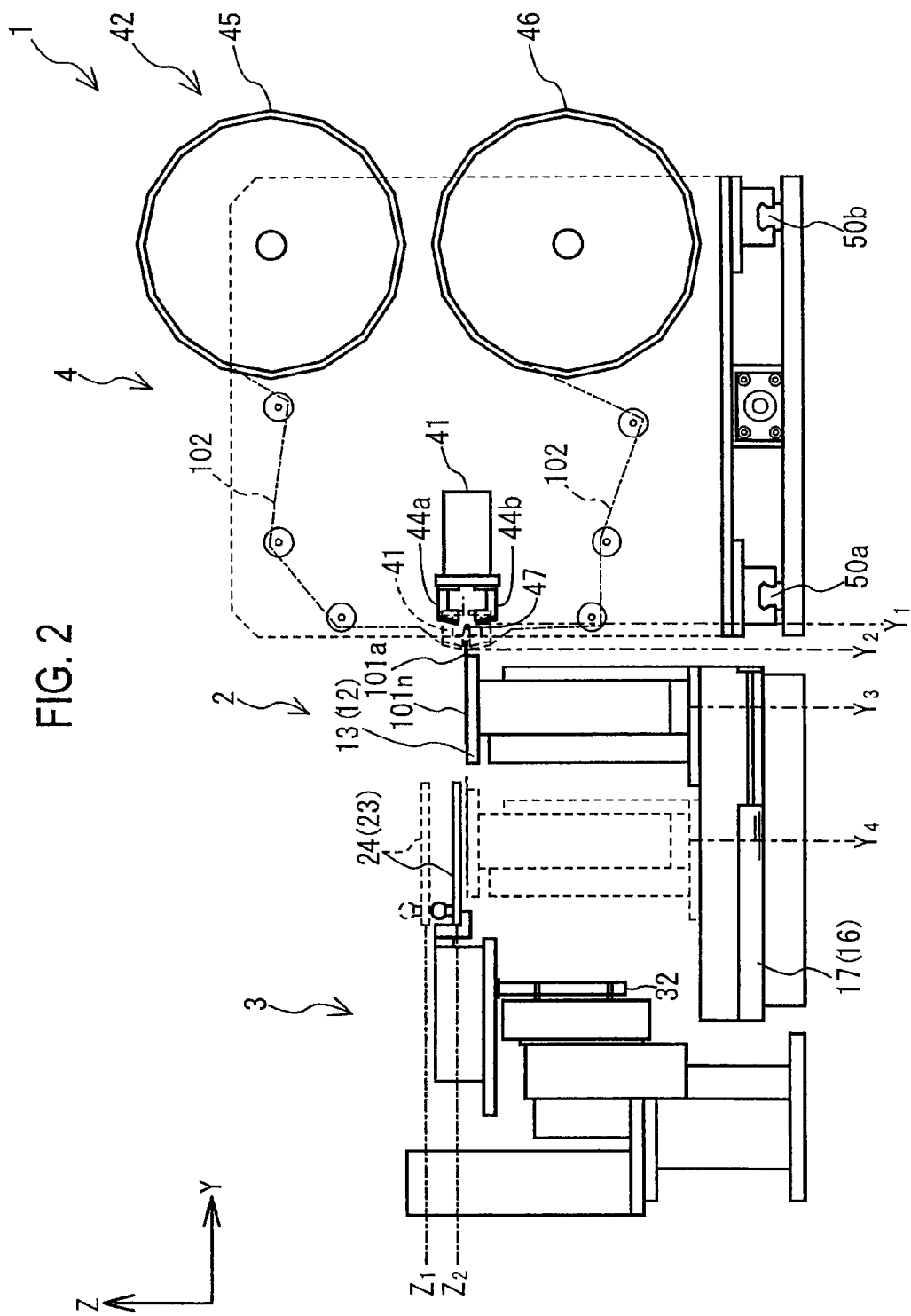
FIG. 2 is a side view of the cleaning apparatus in a direction of an arrow II in FIG. 1.

FIG. 1 is a plan view of a cleaning apparatus according to the embodiment of the present invention. FIG. 2 is a side view of the cleaning apparatus in a direction of an arrow II in FIG. 1. In the following description, X, Y, and Z in coordinates shown in FIGS. 1 and 2 are defined as X, Y, and Z direction. The X direction corresponds to an alignment direction of stages described in claims.

As shown in FIGS. 1 and 2, the cleaning apparatus 1 includes a stage section 2, a conveyance section 3, and a cleaning section 4. The stage and conveyance sections 2 and 3 correspond to a conveyance apparatus described in the claims.

The stage section 2 includes a feeding stage 11, a first working stage 12, a second working stage 13, and a discharging stage 14. The feeding stage 11, first and second working stages 12 and 13, and discharging stage 14 are aligned in the X direction.

The feeding stage 11 is a stage on which a work $101_n$ (n=1, 2, ...) subjected to a previous process and fed is temporarily placed before being fed to the first or second working stage 12 or 13.

The first and second working stages 12 and 13 are stages at which the works $101_n$ are placed and subjected to a same cleaning process. The first and second working stages 12 and 13 are arranged with a predetermined distance therebetween in the X direction. The first and second working stages 12 and 13 include actuators 16 and 17, respectively and are configured to independently move in the Y direction. Each of the actuators 16 and 17 is composed of a piston and an air cylinder. This allows one of the working stages 12(13) to be positioned at a cleaning position $Y_3$ while the other working stage 13(12) is positioned at such a conveyance position $Y_4$ that the work $101_n$ can be conveyed by the conveyance section 3.

The discharging stage 14 is a stage at which the work $101_n$ already subjected to the cleaning process is temporarily placed before being discharged to a subsequent process.

Herein, as shown in FIG. 1, the X coordinate of the feeding stage 11 is a feeding position $X_1$; the X coordinate of the first working stage 12 is a first working position $X_2$; the X coordinate of the second working stage 13 is a second working position $X_3$; and the X coordinate of the discharging stage 14 is a discharging position $X_4$.

Accordingly, the distance between the feeding stage 11 and first working stage 12 is $X_2$-$X_1$, and the distance between the second working stage 13 and discharging stage 14 is $X_4$-$X_3$. The stages 11 to 14 are positioned so that $X_2$-$X_1$=$X_4$-$X_3$. Accordingly, $X_3$-$X_1$=$X_4$-$X_2$. Hereinafter, $X_2$-$X_1$ (=$X_4$-$X_3$) is referred to as $D_1$, and $X_3$-$X_1$ (=$X_4$-$X_2$) is referred to as $D_2$.

The conveyance section 3 conveys the works $101_n$ placed on the four stages 11 to 14 of the stage section 2.

The conveyance section 3 includes a first drive unit 21, a second drive unit 22, a feeding arm 23, and a discharging arm 24.

The first drive unit 21 includes: a ball screw 26 provided so as to extend in the X direction; a drive motor 27 provided at an end of the ball screw 26; and a pair of guide rails 28a and 28b. The ball screw 26 and drive motor 27 are fixed to a working table (not shown). In the first drive unit 21, the drive motor 27 is numerically controlled to rotate the ball screw 21. The first drive unit 21 thus causes the second drive unit 22 and feeding and discharging arms 23 and 24 to be guided by the guide rails 28a and 28b and moved in the X direction.

The second drive unit 22 includes a piston 29, an air cylinder 30, and a guide member 31. In the second drive unit 22, air is supplied to or exhausted from the air cylinder to extend or retract the piston 29. The second drive unit 22 changes the relative position of the discharging arm 24 to the feeding arm 23 while guiding the discharging arm 24 through the guide member 31. Accordingly, the second drive unit 22 changes the distance between the feeding and discharging arms 23 and 24 in the X direction. The position of the discharging arm 24 to the feeding arm 23 is detected by a position sensor (not shown).

Herein, it is configured that the distance between the supplying and discharging arms 23 and 24 is $D_2$ when the piston 29 of the air cylinder 30 of the second drive unit 22 is fully extended at maximum extension. It is configured that the distance between the supplying and discharging arms 23 and 24 is $D_1$ when the piston 29 of the air cylinder 30 of the second drive unit 22 is fully retracted at maximum retraction. The difference between the lengths of the second drive unit 22 at the maximum extension and retraction of the piston 29 is therefore $D_2$-$D_1$.

The feeding arm 23 is used to feed the work $101_n$ placed on the feeding stage 11 to the first or second working stage 12 or 13. The discharging arm 24 is used to discharge the works $101_n$ placed on the first and second working stages 12 and 13 to the discharging stage 14.

The feeding and discharging arms 23 and 24 include sucking mechanisms (not shown) to suck the works $101_n$ onto the bottom surfaces. As shown in FIG. 2, each of the feeding and discharging arms 23 and 24 includes an actuator 32 retractable in the Z direction. The feeding and discharging arms 23 and 24 can be moved by the actuators 23 in the Z direction between a conveyance position $Z_1$ at which the feeding and discharging arms 23 and 24 are positioned to convey the works $101_n$ and a placement position $Z_2$ at which the feeding and discharging arms 23 and 24 are positioned to place the works $101_n$ on the working stage 12 or 13 (or to suck the works $101_n$ placed on the working stages 12 and 13).

The cleaning section 4 includes a cleaning head 41, a cleaning cloth feeding unit 42, a cleaning unit drive mechanism 43, and a fixed stick 47.

The cleaning head 41 puts cleaning cloth 102 over terminals 101a of an electrode of the work $101_n$ to clean the terminals 101a of the work $101_n$. The cleaning head 41 includes a pair of cleaning claws 44a and 44b. The pair of cleaning claws 44a and 44b are configured to move close to and away from each other in the Z direction and move close to each other to allow the cleaning cloth 102 to cover the terminals 101a. The cleaning claw 44a is provided with a cleaning feeding tube (not shown) through which cleaning liquid is pressure fed to the cleaning cloth 102 covering the terminals 101a of the work $101_n$. The cleaning head 41 is configured to be moved in the Y direction by a drive mechanism (not shown). This drive mechanism allows the cleaning head 41 to move between a stand-by position $Y_1$ separated from the work $101_n$ and such a cleaning position $Y_2$ that the work $101_n$ is positioned between the cleaning claws 44a and 44b.

The cleaning cloth feeding unit 42 includes a feeding roller 45 and a retrieving roller 46 rotatably supported. The cleaning cloth feeding unit 42 feeds cleaning close 102 to the cleaning head 41 from the feeding roller 45 with the cleaning cloth 102 wound therearound and retrieves the cleaning cloth 102 after the cleaning cloth 102 passes the cleaning head 41.

The cleaning section drive mechanism 43 includes a drive motor 48, a ball screw 49, and a pair of guide rails 50a and 50b. As shown in FIG. 2, in the cleaning section drive mechanism, the drive motor 48 is numerically controlled to rotate the ball screw 49. The cleaning section drive mechanism 43 thus moves the cleaning head 41 and cleaning cloth feeding section 42 from a first cleaning start position $X_5$ to a second cleaning end position X along the guide rails 50a and 50b, respectively. Herein, the first cleaning start position $X_5$ is a position at which the cleaning process of the work $101_n$ on the first working stage 12 starts. The second cleaning end position $X_8$ is a position at which the cleaning process of the work $101_n$ on the second working stage 13 ends. Between the first cleaning start position $X_5$ and second cleaning end position $X_8$, there are a first cleaning end position $X_6$ at which the cleaning process of the work $101_n$ on the first working stage 12 ends and a second cleaning start position $X_7$ at which the cleaning process of the work $101_n$ on the second working stage 13 starts.

The fixed stick 47 prevents the cleaning cloth 102 from pressing an end surface of the work $101_n$ facing the +Y direction. This can prevent the work $101_n$ from being displaced in the −Y direction by the cleaning cloth 102. The fixed stick 47 is fixed so as not to move even when the cleaning head 41 moves in the Y direction. Herein, when the cleaning head 41 is positioned at the stand-by position $Y_1$, the position in the Y direction at which the fixed stick 47 is fixed is located beyond the tips of the cleaning claws 44a and 44b in the −Y direction. On the other hand, the position in the Y direction at which the fixed stick 47 is fixed is located beyond the tips of the cleaning claws 44a and 44b in the +Y direction. The fixed stick 47 is fixed so as to be located beyond the cleaning cloth 102 in the −Y direction in a plane at a same position in the Z direction. The position in the Z direction at which the fixed stick 47 is fixed is substantially in the middle between the cleaning claws 44a and 44b, and the fixed stick 27 is fixed at a substantially same position as that of the work $101_n$ in the Z direction.

Figure 3:
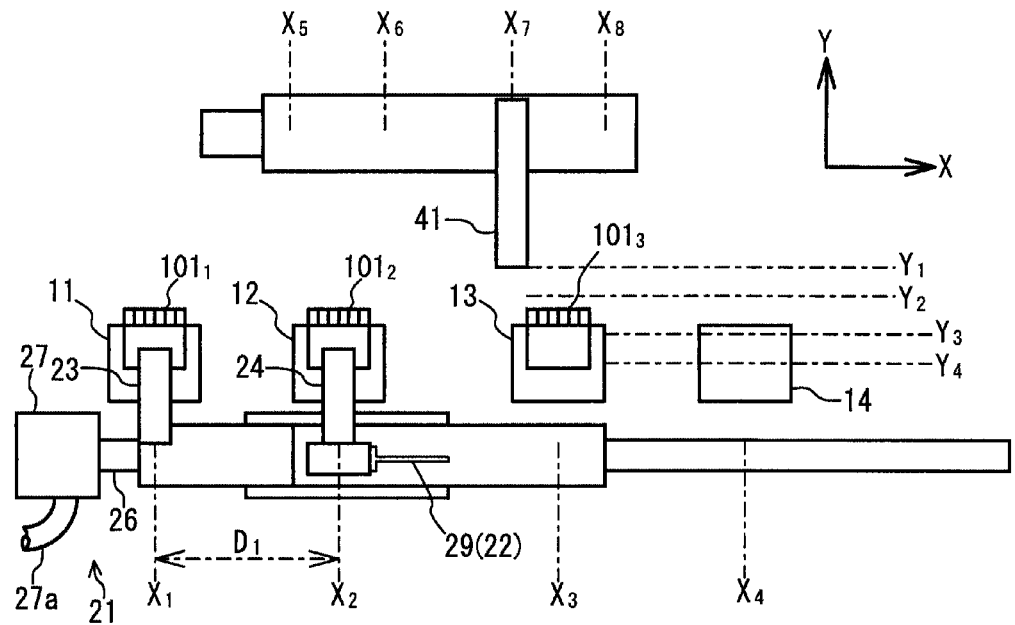
FIG. 3 is a plan view for schematically explaining a process at the cleaning apparatus.
Figure 4:
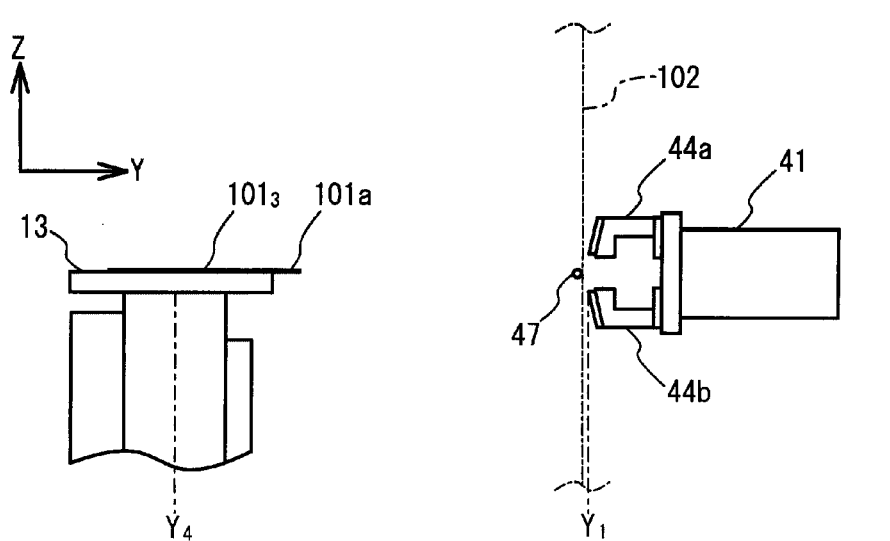
FIG. 4 is a side view around a cleaning head for schematically explaining a process.
Figure 5:
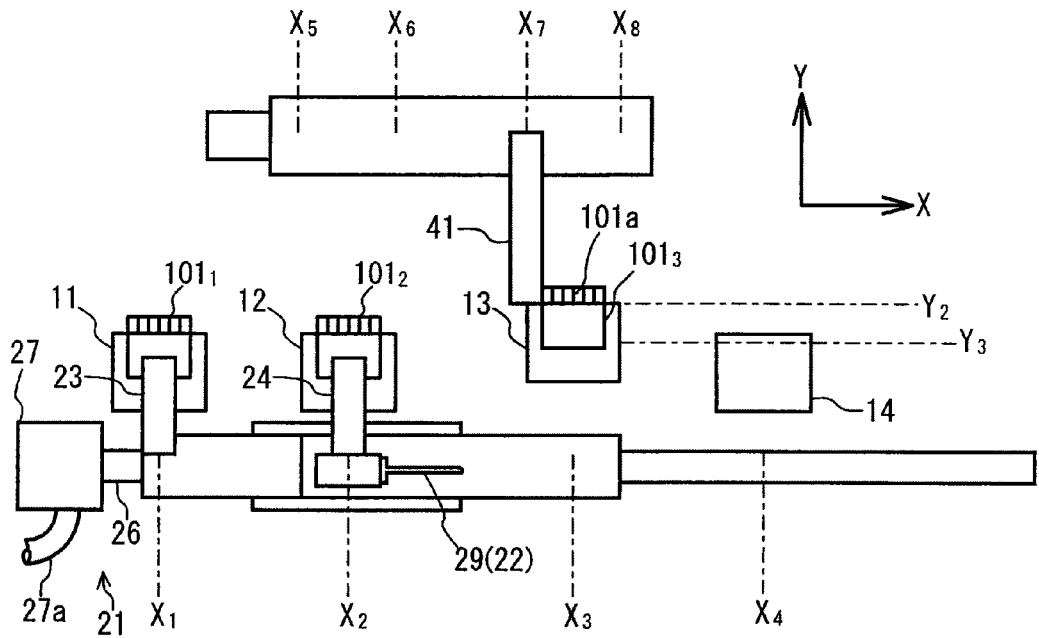
FIG. 5 is a plan view of the cleaning apparatus for schematically explaining a process.
Figure 6:
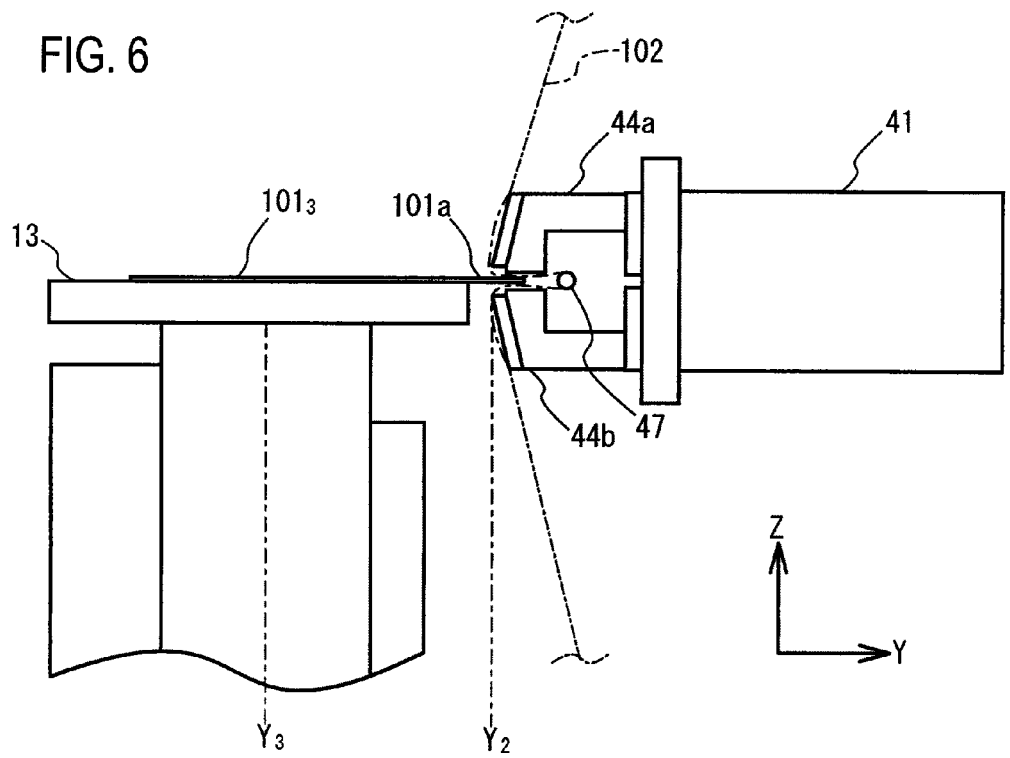
FIG. 6 is a side view around the cleaning head for schematically explaining a process.

Next, with reference to FIGS. 3 to 14, a description is given of a manufacturing process of a liquid crystal display, focusing on the conveyance process and cleaning process. FIGS. 3, 5, and 7 to 14 are plan views of the cleaning apparatus for schematically explaining the processes. FIGS. 4 and 6 are side views of the cleaning head and therearound for schematically explaining the processes. Reference numeral 27a denotes a wire through which power and signals are transmitted to the drive motor 27.

First, in a display unit assembly process, electrodes are formed in surfaces of two glass substrates corresponding to inner surfaces of a display unit, and then the two glass substrates are attached to each other and sealed with crystal liquid injected therebetween so that electrode terminals is exposed, thus assembling the display unit (hereinafter, referred to as a work).

Next, the cleaning process and the conveyance process to convey the work in the cleaning process are performed. The cleaning and conveyance processes are described in detail.

First, as shown in FIGS. 3 and 4, the following description starts from the state where the works $101_1$, $101_2$, and $101_3$ are placed on the stages 11, 12, and 13, respectively. The terminals 101a of the work $101_2$ placed on the first working stage 12 is already cleaned. On the other hand, the terminals 101a of the work $101_3$ placed on the second working stage 13 is not cleaned yet. The feeding arm 23 is positioned at the feeding position $X_1$. The discharging arm 24 is set closest to the feeding arm 23 by the piston 29 at maximum extension and is positioned at the first working position $X_2$. The working stages 12 and 13 are positioned at the conveyance position $Y_4$ in the direction Y. The cleaning head 41 is positioned at the second cleaning start position $X_7$ by the cleaning section drive mechanism 43 in the X direction and is positioned at a stand-by position $Y_1$ in the Y direction. In an area corresponding to the position of the work $101_3$ in the Z direction, the cleaning cloth 102 is arranged between the tips of the cleaning claws 44a and 44b and fixed stick 47 in the Y direction.

Next, as shown in FIGS. 5 and 6, the cleaning head 41 positioned at the second cleaning start position $X_7$ is moved by the drive mechanism from the stand-by position $Y_1$ to the cleaning position $Y_2$ while the cleaning claws 44a and 44b are closed. The second working stage 13 is moved from the conveyance position $Y_4$ to the cleaning position $Y_3$. As shown in FIG. 6, the terminals 101a of the work $101_3$ on the second working stage 13 is thus inserted into between the closed cleaning claws 44a and 44b. The cleaning cloth 102 is therefore pressed by the cleaning claws 44a and 44b in the −Y direction. The cleaning cloth 102 is pressed by the work $101_3$ in the +Y direction to cover the terminals 101a of the work $101_3$. Furthermore, to prevent the work $101_3$ from being pressed at an end by the cleaning cloth 102 and being displaced in the −Y direction, a part of the cleaning cloth 102 whose position in the direction Z is the same as that of the work $101_3$ is pressed by the fixed stick 47. The feeding arm 23 positioned at the feeding position $X_1$ then sucks the work $101_1$ on the feeding stage 11. The discharging arm 24 is positioned at the first working position $X_2$ corresponding to the first working stage 12 and sucks the work $101_2$ on the first working stage 12. In this process of sucking the works $101_1$ and $101_2$, the arms 23 and 24 reciprocate between the conveyance position $Z_1$ and placement position $Z_2$ in the Z direction before and after the suction. In the following description, the description about movement of the arms 23 and 24 in the direction Z is omitted.

Figure 7:
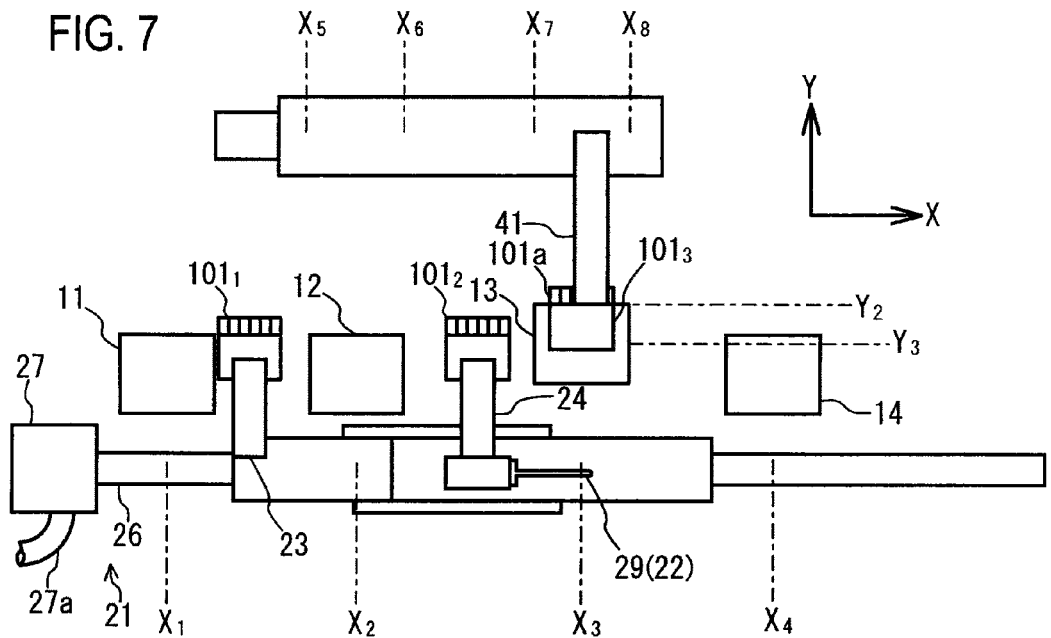
FIG. 7 is a plan view of the cleaning apparatus for schematically explaining a process.

Next, as shown in FIG. 7, the feeding and discharging arms 23 and 24 are moved by the first drive unit 21 while the discharging arm 24 is moved away from the feeding arm 23 by retraction of the piston 29 of the second drive unit 22. The first conveyance process is thus started in which the work $101_1$ is conveyed from the feeding stage 11 to the first working stage 12 while the work $101_2$ is conveyed from the first working stage 12 to the discharging stage 14. While the feeding and discharging arms 23 and 24 are in operation of the aforementioned first conveyance process, the cleaning head 41 performing the second cleaning process of cleaning the terminals $101a$ of the work $101_3$ and moves from the second cleaning start position $X_7$ to the second cleaning end position Xs by the cleaning section drive mechanism 43.

Figure 8:
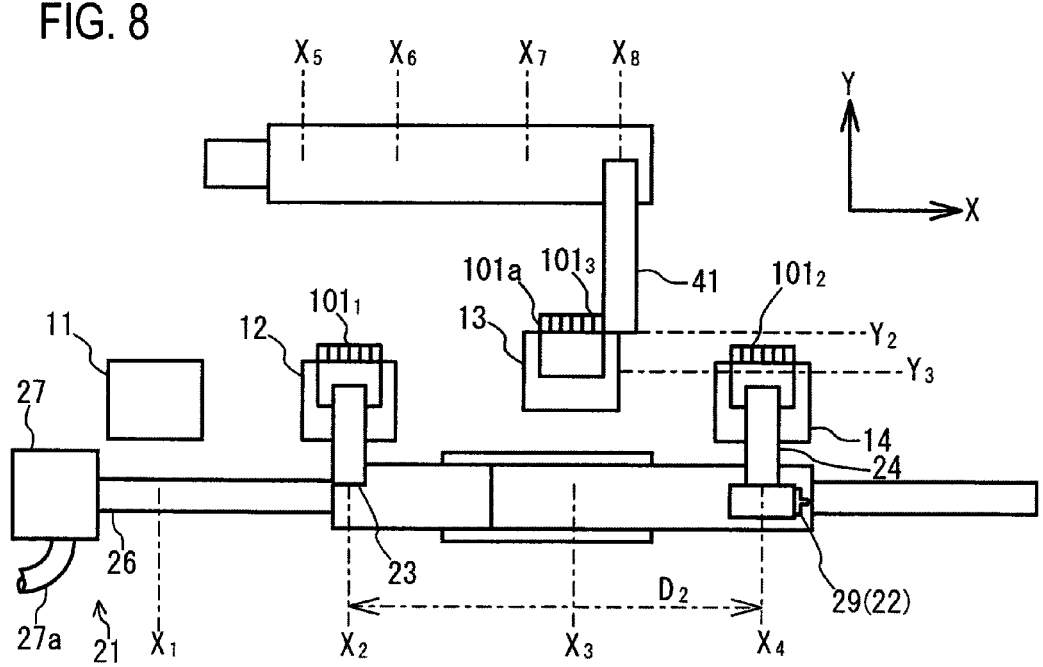
FIG. 8 is a plan view of the cleaning apparatus for schematically explaining a process.

Next, as shown in FIG. 8, when the feeding and discharging arms 23 and 24 are moved by the first drive unit 21 and the feeding arm 23 reaches the first working stage 12, the feeding arm 23 releases the work $101_1$ to place the same on the first working stage 12. The piston 29 of the second drive unit 22 reaches maximum retraction, and the distance between the feeding and discharging arm 23 and 24 becomes $D_2$, which is the longest. The discharging arm 24 reaches the discharging position $X_4$ at which the discharging stage 14 is positioned and releases the work $101_2$ to place the work $101_2$ on the discharging stage 14. The first conveyance process is thus completed. During the first conveyance process, the cleaning head 41 is moved by the cleaning section drive mechanism 43 to the second cleaning end position $X_8$ and finishes the second cleaning process.

Figure 9:
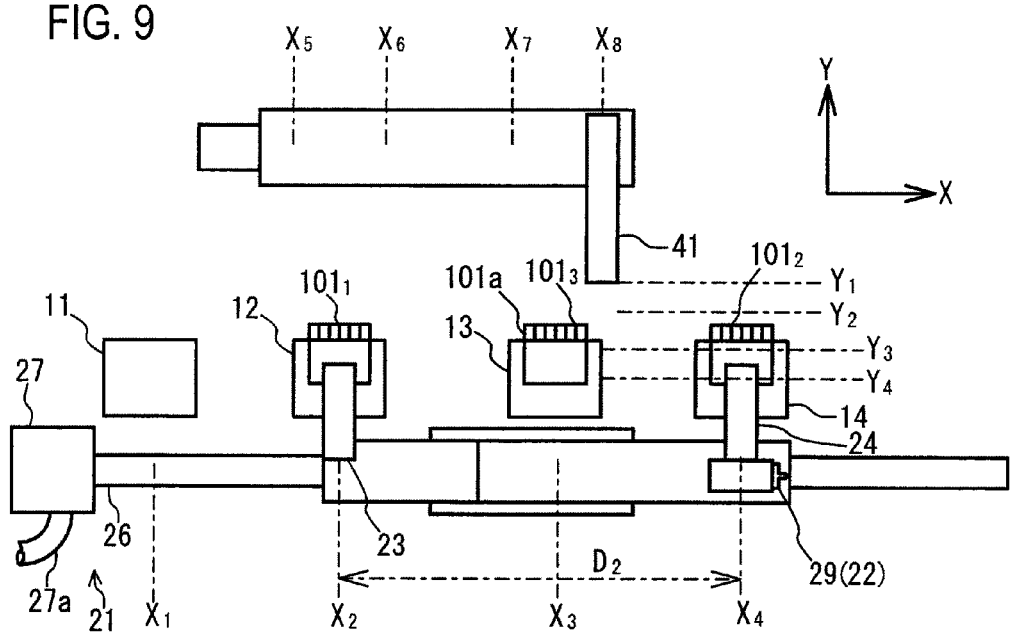
FIG. 9 is a plan view of the cleaning apparatus for schematically explaining a process.

Next, as shown in FIG. 9, the second working stage 13 is moved to the conveyance position $Y_4$, and the cleaning head 41 is moved to the stand-by position $Y_1$. As described above, the working stages 12 and 13 and cleaning head 41 are moved close to or away from each other to clean the works $101_n$, but the description about the movement in the Y direction is omitted below.

Figure 10:
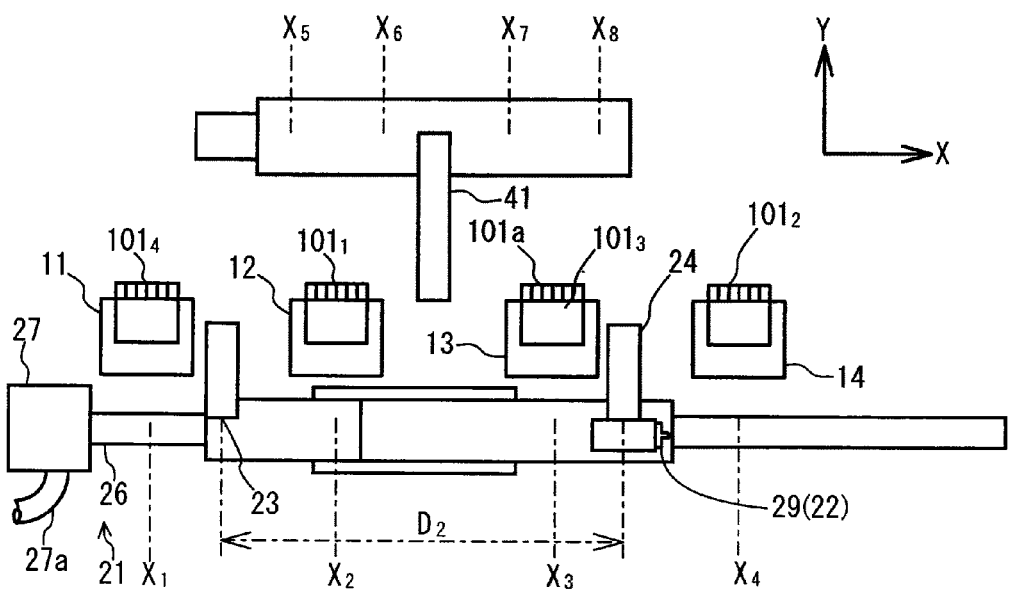
FIG. 10 is a plan view of the cleaning apparatus for schematically explaining a process.

Next, as shown in FIG. 10, the feeding and discharging arms 23 and 24 which do not hold any work are moved by the first drive unit 21. The feeding arm 23 is thus moved toward the feeding position $X_1$ at which the feeding stage 11 is positioned. The discharging arm 24 is moved toward the second working position $X_3$ at which the discharging stage 13 is positioned. During this moving process of the feeding and discharging arms 23 and 24, the piston 29 of the second drive unit 22 does not extend or retract, and the distance $D_2$ between the feeding and discharging arms 23 and 24 is maintained constant. The cleaning head 41 is moved by the cleaning section drive mechanism 43 from the second cleaning end position $X_8$ toward the first cleaning start position $X_5$ along the terminals $101a$. During this process, a next work $101_4$ already subjected to the previous process is fed to the feeding stage 11.

Figure 11:
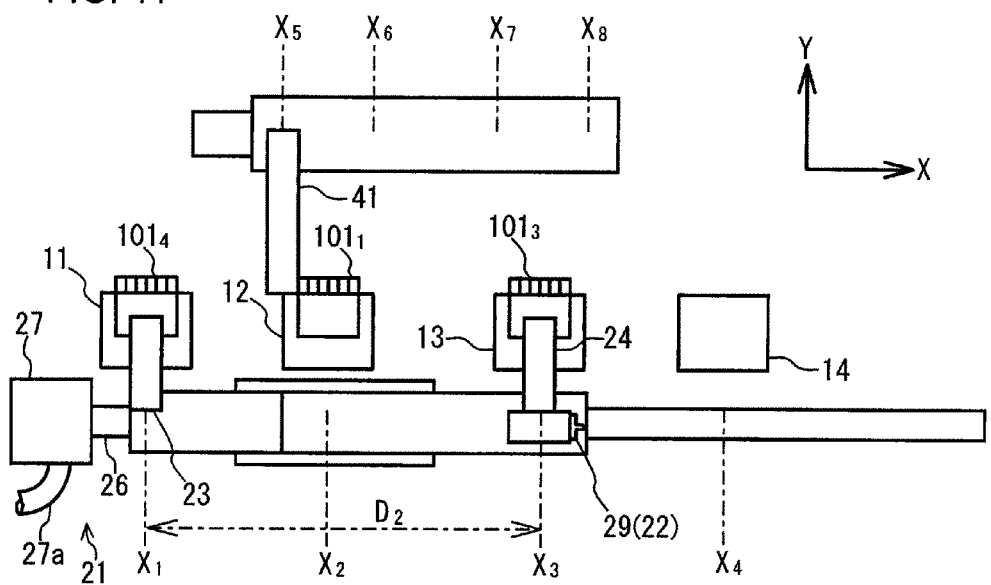
FIG. 11 is a plan view of the cleaning apparatus for schematically explaining a process.

Next, as shown in FIG. 11, upon reaching the feeding position $X_1$ by the first drive unit 21, the feeding arm 23 sucks and holds the work $101_4$ placed on the feeding stage 11. Upon reaching the second working position $X_3$ by the first drive unit 21, the discharging arm 24 sucks and holds the work $101_3$ placed on the second working stage 13. The cleaning head 41 reaches the first cleaning start position $X_5$ by the cleaning section drive mechanism 43.

Figure 12:
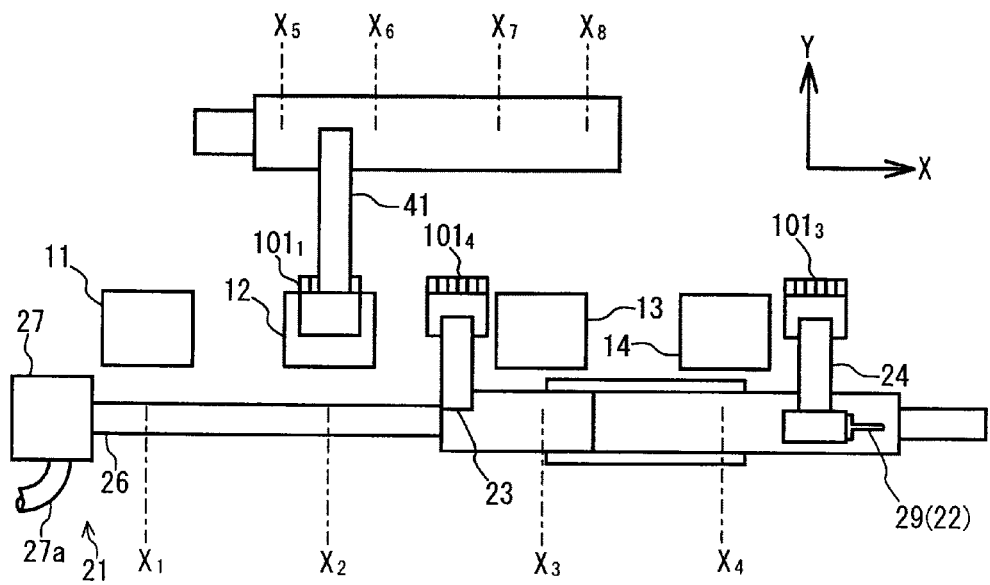
FIG. 12 is a plan view of the cleaning apparatus for schematically explaining a process.

Next, as shown in FIG. 12, the feeding and discharging arms 23 and 24 are moved by the first drive unit 21 while the discharging arm 24 is moved by extension of the piston 29 of the second drive unit 22 so as to be close to the feeding arm 23. The second conveyance process is started, in which the work $101_4$ is conveyed from the feeding stage 11 to the second working stage 13 while the work $101_3$ is conveyed from the second working stage 13 to the discharging stage 14. While the feeding and discharging arms 23 and 24 perform the aforementioned second conveyance process, the cleaning head 41 starts the first cleaning process of cleaning the terminals $101a$ of the work $101_1$ placed on the first working stage 12 and is moved by the cleaning section drive mechanism 43 from the first cleaning start position $X_5$ toward the first cleaning end position $X_6$ along the terminals $101a$.

Next, as shown in FIG. 13, the feeding and discharging arms 23 and 24 are moved by the first drive unit 21. Upon reaching the second working stage 13, the feeding arm 23 releases the sucked and held work $101_4$ to place the same on the second working stage 13. The piston 29 of the second drive unit 22 reaches the maximum extension to bring the feeding and discharging arm 23 and 24 closest to each other at the distance $D_1$. Accordingly, upon reaching the discharging position $X_4$ at which the discharging stage 15 is positioned, the discharging arm 24 releases the work $101_3$ sucked to place the work $101_3$ on the discharge stage 14. The first conveyance process is completed. During the first conveyance process, the cleaning head 41 is moved by the cleaning section drive mechanism 43 to the first cleaning end position $X_6$ and finishes the first cleaning process.

Next, as shown in FIG. 14, the feeding and discharging arms 23 and 24 are moved by the first drive unit 21. The feeding arm 23 is thus moved toward the feeding position $X_1$ at which the feeding stage 11 is positioned. The discharging arm 24 is moved toward the first working position $X_2$ at which the first working stage 12 is positioned. In this moving process of the feeding and discharging arms 23 and 24, the piston 29 of the second drive unit 22 does not extend or retract, and the distance $D_1$ between the feeding and discharging arms 23 and 24 is maintained constant. The cleaning head 41 is moved by the cleaning section drive mechanism 43 from the first cleaning end position $X_6$ toward the second cleaning start position $X_7$. During this process, a next work $101_5$ already subjected to the previous process is fed to the feeding stage 11.

The cleaning and conveyance processes described based on FIGS. 3 to 14 are repeated.

Next, the work (display unit) $101_n$ already subjected to the cleaning process is provided with the terminals $101a$ being electrically connected to a driver IC (not shown), thus manufacturing the liquid crystal display.

As described above, the cleaning apparatus 1 according to the embodiment of the present invention includes the two working stages 12 and 13. This makes it possible to clean the work v placed on one of the working stages 12(13) while conveying the work $101_n$ placed on the other working stage 13(12). The conveyance and cleaning processes can be therefore simultaneously performed, and the manufacturing time can be shortened.

Moreover, in the conveyance section 3, the drive motor 27 is fixed. It is therefore possible to prevent damages of wires such as the power line 27$a$ for use in supplying power to the drive motor 27. Although especially moving the drive motor together with thick wires such as the power line places a burden on the drive motor, the conveyance section 3 can also solve such a burden.

Furthermore, the distance between the feeding and discharging arms 23 and 24 is controlled by the second drive unit 22 including the air cylinder 30 and piston 29. The second drive unit 22 can be therefore composed of a thin tube for use in supplying air to the air cylinder 30 and a thin wire for a position sensor detecting retraction of the piston 29. Accordingly, compared to the case including a drive motor requiring a power line and the like, the second drive unit 22 can be simpler and cheaper.

Hereinabove, the present invention is described in detail using the embodiment but is not limited to the embodiment described in this specification. The scope of the present invention is determined by the claims and the scope equivalent to the scope of the claims. The following description is given of modifications of the aforementioned embodiment with some parts modified.

For example, in the aforementioned embodiment, the conveyance apparatus of the present invention is applied to the stage and conveyance sections used in the cleaning process. However, the aforementioned conveyance apparatus (stage and conveyance sections) can be applied to another process such as a process of attaching a driver IC to the terminals of the work.

What is claimed is:

1. A conveyance apparatus comprising:
    a stage section including: a feeding stage on which a work to be fed is placed; a first working stage on which the work is subjected to a working process; a second working stage on which the work is subjected to the same working process as that of the first working stage; and a discharging stage on which the work to be discharged is placed, the feeding stage, first working stage, second working stage, and discharging stage being sequentially aligned; and
    a conveyance section including: a feeding arm feeding the work from the feeding stage to the first or second working stage; a discharging arm which is provided on the discharging stage side of the feeding arm and discharges the work from the first or second working stage to the discharging stage; a first drive unit moving the feeding and discharging arms in an alignment direction of the four stages; and a second drive unit changing distance between the feeding and discharging arms in the alignment direction,
    wherein the first drive unit comprises: a ball screw extending in the alignment direction; and a drive motor fixed to rotate the ball screw.

2. The conveyance apparatus according to claim 1, wherein the second drive unit comprises a piston and a cylinder extending and retracting the piston,
    a distance between the feeding and first working stages and a distance between the second working and discharging stages are $D_1$,
    a distance between the feeding and second stages and a distance between the first working and discharging stages are $D_2$, and
    a distance between lengths of the second drive unit at maximum extension and maximum retraction of the piston is $D_2 - D_1$.

3. The conveyance apparatus according to claim 1, wherein the first drive unit moves the second drive unit in the alignment direction.

4. The conveyance apparatus according to claim 2, wherein the first drive unit moves the second drive unit in the alignment direction.

5. A cleaning apparatus comprising:
    a stage section including: a feeding stage on which a work to be fed is placed; a first working stage on which the work is subjected to a cleaning process; a second working stage on which the work is subjected to the same cleaning process as that of the first working stage; and a discharging stage on which the work to be discharged is placed, the feeding stage, first working stage, second working stage, and discharging stage being sequentially aligned;
    a conveyance section including: a feeding arm feeding the work from the feeding stage to the first or second working stage; a discharging arm which is provided on the discharging stage side of the feeding arm and discharges the work from the first or second working stage to the discharging stage; a first drive unit moving the feeding and discharging arms in an alignment direction of the four stages; and a second drive unit changing distance between the feeding and discharging arms in the alignment direction; and
    a cleaning section including: a cleaning head cleaning the works; and a cleaning section drive mechanism moving the cleaning head in the alignment direction,
    wherein the first drive unit comprises: a ball screw extending in the alignment direction; and a drive motor fixed to rotate the ball screw.

6. The cleaning apparatus according to claim 5, wherein the cleaning section drive mechanism performs cleaning movement from an end of the work to the other end to clean the work and performs inter-stage movement between the first and second working stages.

7. The cleaning apparatus according to claim 6, wherein the cleaning movement and inter-stage movement are along the alignment direction.

8. The cleaning apparatus according to claim 7, wherein the cleaning section drive mechanism comprises a drive motor performing both the cleaning movement and inter-stage movement.

9. The cleaning apparatus according to claim 5, wherein the second drive unit comprises a piston and a cylinder extending and retracting the piston,
    a distance between the feeding and first working stages and a distance between the second working and discharging stages are $D_1$,
    a distance between the feeding and second stages and a distance between the first working and discharging stages are $D_2$, and
    a distance between lengths of the second drive unit at maximum extension and maximum retraction of the piston is $D_2 - D_1$.

10. The cleaning apparatus according to claim 5, wherein the first drive unit moves the second drive unit in the alignment direction.

11. The cleaning apparatus according to claim 9, wherein the first drive unit moves the second drive unit in the alignment direction.

* * * * *